United States Patent [19]

Schievelbein

[11] Patent Number: 4,464,268

[45] Date of Patent: Aug. 7, 1984

[54] METHOD FOR RESTORING PERMEABILITY OF INJECTION WELLS

[75] Inventor: Vernon H. Schievelbein, Houston, Tex.

[73] Assignee: Texaco Inc., White Plains, N.Y.

[21] Appl. No.: 338,775

[22] Filed: Jan. 11, 1982

[51] Int. Cl.$^3$ ...................... E21B 43/25; E21B 43/27
[52] U.S. Cl. .............................. 252/8.55 B; 166/311; 166/312; 166/307; 252/8.55 C
[58] Field of Search ..................... 252/8.55 B, 8.55 C; 166/311, 312, 307

[56] References Cited

U.S. PATENT DOCUMENTS

| | | | |
|---|---|---|---|
| 3,482,636 | 12/1969 | Crowe | 166/307 |
| 3,529,666 | 9/1970 | Crowe | 166/312 |
| 3,529,669 | 9/1970 | Tietz | 166/307 |
| 3,556,221 | 1/1971 | Haws | 166/305 |

Primary Examiner—Christine M. Nucker
Attorney, Agent, or Firm—Jack H. Park; Walter D. Hunter; Richard A. Morgan

[57] ABSTRACT

A method is disclosed for restoring permeability of injection wells which have become plugged with polymer residue, protein debris, biological matter and the like. The method includes treating the well for a period of time with an aqueous solution containing hydrogen peroxide and optionally a surfactant.

7 Claims, No Drawings

METHOD FOR RESTORING PERMEABILITY OF INJECTION WELLS

BACKGROUND OF THE INVENTION

1. Field of the Invention

This invention relates to a method of stimulating petroleum wells. More particularly, this invention relates to a method of improving the flow characteristics of injection wells which have become plugged with polymer residue, protein debris, biological matter and the like. The method includes treating the well for a period of time with an aqueous solution containing an oxidizing agent and optionally a surfactant.

2. Prior Art

Petroleum is normally recovered from subterranean formations in which it has accumulated by penetrating and thereby establishing fluid communication with the formation with one or more wells and pumping or permitting the petroleum to flow to the surface through these production wells. This method of petroleum recovery, known as primary recovery will ordinarily recover 20 to 30% of the petroleum existing in the formation.

Once primary production has ceased, secondary recovery methods such as water or steam flooding techniques are often called for. Secondary recovery is accomplished by penetrating the formation with an injection well thereby establishing fluid communication with the formation. Water or steam is then forced into the injection well and as a result, petroleum and water are recovered at the recovery well. A successful water flood may result in recovery of 30 to 50% of the original petroleum left in place. However, generally the application of water flooding to many formations results in much lower recoveries.

Persons skilled in the art of petroleum recovery have recognized the inherently low recoveries in water flooding and many additives have been described in the literature to improve recoveries. These additives include surfactants to decrease the interfacial tension between the petroleum and the aqueous drive fluid. Other additives include polymers such as polysaccharides and polyacrylamides to more closely match the viscosity of the drive fluid to that of the petroleum and thereby reduce the tendency of the aqueous drive fluid to finger with a corresponding loss of contact and efficiency. The use of such additives in the drive fluid is usually referred to as tertiary recovery.

The use of surfactants and polymers in the aqueous drive fluid allows significant improvement in petroleum recovery. However this use also causes damage to the permeability of the formation due to plugging in the well bore. Even though the polymers used are considered soluble in water, these polymer solutions may deposit polymer in the sand or rock formation adjacent the well bore thus reducing the permeability of drive fluids to the formation. Other substances that cause formation plugging are naturally occuring animal and plant life including algae which sometimes grow and multiply around a well bore. Such growth results in a state of substantially reduced permeability to the aqueous drive fluid.

Several treating agents have been proposed to alleviate this problem (U.S. Pat. Nos. 3,482,636; 3,529,669 and 3,556,221) with sodium hypochlorite being the preferred treatment agent. Sodium hypochlorite is a drastic treatment agent which must be used in alkaline solution. When the alkaline solution mixes with the brine already present in the formation, calcium and magnesium salts may precipitate insoluble carbonates and hydroxides which plug the formation pores. When such precipitation occurs, it would be desirable to mix an acid with the treatment agent to dissolve the precipitate plug. This is not possible with a sodium hypochlorite solution however, because such a solution decomposes to chlorine gas and sodium salt upon acidification.

There is a need in the art for a method of restoring permeability to injection wells plugged by water insoluble polymer and biological debris in which the disadvantages of presently practiced methods are eliminated or avoided.

SUMMARY OF THE INVENTION

This invention relates to a method of restoring the permeability of a porous subterranean petroleum containing formation adjacent a well bore wherein synthetic or organic polymeric material and biological matter are lodged in the pores thus restricting the flow of aqueous fluids such as the flow of drive fluid into the injection well in a petroleum recovery process. The method comprises injecting into the formation, through the well bore, an aqueous solution consisting of water or brine wherein is dissolved from about 1 to about 30% by weight of hydrogen peroxide and then allowing the well to remain quiescent for a period of time.

An additional embodiment of this invention relates to the aqueous solution which may also contain dissolved therein a small amount of a surfactant and optionally an acid.

DETAILED DESCRIPTION OF THE INVENTION

A typical tertiary recovery process which precipitates the need for the present invention involves the injection of an aqueous drive fluid into an injection well and the recovery of petroleum and aqueous fluids from the production well. The aqueous drive fluid contains either organic or synthetic polymeric material and often a surfactant.

Organic polymeric materials are typically homopolysaccharides, xanthan gum heteropolysaccharides and adducts of these materials which may be used alone or in combination. These polymers are used in a molecular weight ranging from about 500,000 to about 10,000,000 or more. Kelzan ®, a xanthan gum polysaccharide, is a typical water soluble drive fluid polymer. Kelzan ® as received from the manufacturer is generally contaminated with water insoluble protein debris which will plug injection wells. The method of drive fluid make up can also augment well plugging. Hydration of polysaccharides prior to use requires extreme care and if a polysaccharide such as Kelzan ® is not properly hydrated, it may plug the rock or sand matrix near the injection well.

Synthetic polymers include polyacrylamide, polymers containing acrylamide monomer, such as acrylamide-vinyl sulfonic acid copolymers and adducts thereof which improve viscosity or solubility such as partially hydrolyzed acrylamide or alkoxylated acrylamide (U.S. Pat. Nos. 4,217,230; 4,228,016, 4,228,017 and 4,228,018). These polymers range in molecular weight from about 500,000 to about 10,000,000 or more.

Generally, polymer plugging occurs at or near the formation face in the well bore. The porous formation face acts as a sieve to filter and accumulate insoluble and entrained matter from the aqueous drive fluid. As stated previously, this insoluble matter includes improperly hydrated polymer, protein debris and biological matter which grow and multiply around the well bore. With time the accumulation becomes sufficient to substantially reduce the relative permeability of the formation face to the drive fluid whereupon petroleum production is attenuated.

A new method has now been found for restoring the permeability of a porous subterranean petroleum containing formation adjacent a well bore wherein organic or synthetic polymeric material and biological matter are lodged in the pores thus restricting the flow of aqueous fluids. The method comprises injecting into the formation through the well bore and thereby contacting the polymeric material and biological matter with an aqueous solution consisting of water or brine wherein is dissolved from about 1% to about 30% by weight or more and preferrably from about 2% to about 10% by weight of hydrogen peroxide and then allowing the well to remain quiescent for a period of time.

Optionally a small amount of a surfactant may be added to the aqueous solution to enhance wetting and contact between hydrogen peroxide in solution and the formation face and pore surfaces within the formation. About 200 ppm to about 2% by weight or more and preferrably about 0.1% to about 1.0% by weight of surfactant is sufficient for this purpose. A wide variety of surfactants such as ethoxylated alcohols and alkyl phenols, alkylaryl sulfonates, and alkyl and alkylaryl polyethoxylated sulfates and sulfonates may be included as part of the aqueous solution. Nonylphenol ethoxylated with from about 5 to about 15 moles of ethylene oxide is compatible. A 9.5-molar ethoxylated nonyl phenol gives good results.

Optionally, the hydrogen peroxide containing solution may be acidified by adding an acid such as hydrochloric, hydroflouric or acetic acid in a concentration of from about 1% to about 30% by weight and preferably about 1% to about 15% by weight. These acids are effective in dissolving inorganic precipitates such as calcium or magnesium carbonates or hydroxides. Hydrochloric acid is preferred.

In the course of treating a well by the method of this invention, sufficient solution should be used to fill the well bore and to fill the porous formation with solution to a distance of about 1 foot to about 20 feet or more from the formation face. Treating the porous formation from a distance of about 1 foot to about 3 feet is usually sufficient to attain good results. Once the well is injected with solution the well is allowed to remain quiescent for from about 2 to about 96 hours or more and preferably about 12 to about 36 hours to allow time for the hydrogen peroxide to diffuse into the pores and react with plugging material. The well is then either backflowed to remove unreacted hydrogen peroxide and dislodged plugging material or displaced with water, brine or an injection fluid. Optionally, the well may be displaced with an aqueous solution containing water or brine and about 0.5% to about 3% by weight or more sodium bisulfite. Sodium bisulfite is desirable because it reacts residual hydrogen peroxide which might otherwise interfere with subsequently injected polymer.

Alternatively, the well may be treated in a continuous flow method by circulating the aqueous solution down the tubing of the well bore and out the annulus for a period of time sufficient for the hydrogen peroxide solution to diffuse into the formation and react with plugging material. The period of time is usually from about 2 hours to 96 hours or more and preferably about 12 hours to about 36 hours. The treatment solution may then be displaced with the aqueous sodium bisulfite solution previously mentioned or by water, brine or a drive fluid.

After treatment, polymer injection is resumed and petroleum and aqueous fluids are recovered at the production well.

The mechanism of the permeability increase of this invention is not known with certainty. It is thought that the hydrogen peroxide cleaves the polymer molecule, reducing chain length and viscosity thereby enhancing flow through the formation. The peroxide may also liberate oxygen gas. The action of liberated oxygen gas dislodges polymer, water insoluble protein debris and biological matter from the surface, unplugging the pore. Hydrogen peroxide is known to be effective in oxidizing biological matter. This biological oxidation assists removal of biological matter from formation pores. The aqueous solution of this invention may optionally contain a surfactant to improve wettability. Without a surfactant present, insoluble debris and other matter may resist treatment due to contamination with petroleum and lack of contact with the aqueous hydrogen peroxide solution and hence reduced effectiveness of the method of this invention. A small amount of surfactant enhances contact of the solution with water insoluble matter and increases effectiveness of the solution.

The use of hydrogen peroxide is inherently environmentally safe because the degradation products are oxygen and water. The treatment method is mild and no special precautions need be taken to safeguard equipment or the formation matrix. The solutions is effective at neutral pH as well as acidic and alkaline pH's. Corrosion inhibiters are not required for the protection of equipment.

The practice of this invention is illustrated by the Examples set out below:

EXAMPLE I

A Slaughter field core (dolomite rock from the B. Slaughter field petroleum reservoir) 13.7 cm long and 5.08 cm diameter which had previously been found to have a permeability of 25 millidarcies (md) was saturated with a mixture of Slaughter field petroleum and heptane. The core was first injected with Slaughter field ground water and then with a 1000 ppm Kelzan ® drive fluid until the core was substantially plugged. After cleaning the core by displacing with deionized water, isopropyl alcohol and benzene, permeability of the core was determined to be 6 md.

Approximately 100 cm$^3$ of 3% by weight hydrogen peroxide solution was forced into one end of the 60 cm$^3$ pore volume core. After the hydrogen peroxide was allowed to react for 18 hours, the hydrogen peroxide solution was displaced with deionized water. A 1% by weight sodium bisulfite solution was then forced through the core to react residual hydrogen peroxide. Permeability of the treated core was found to be 24 md.

EXAMPLE II

In a field in which the formation is characterized by core sampling as consolidated sandstone, primary production has been exhausted. An injection well is completed in the hydrocarbon-bearing formation and perforations are formed between the interval of 5130–5145 ft.

A production well is drilled approximately 415 feet distance from the injection well, and perforations are similarly made in the same hydrocarbon-bearing formation at 5135-5150 feet.

An aqueous, 12 cp Kelzan ® fluid is injected into the injection well. After 1 month the injectivity is 300 bbl/day at 2000 psi injection pressure. After four months of polymer injection, injectivity decreases to 200 bbl/day at the same injection pressure. The well is then stimulated with an aqueous solution consisting of 3% by weight hydrogen peroxide; 0.5% by weight, 9.5-molar ethoxylated nonyl phenol and 3% by weight hydrochloric acid. Sufficient solution is injected to fill the well bore and the formation, which from core samples is shown to have a porosity factor of 0.4, to a distance of 3 ft. from the well bore. The well is allowed to remain quiescent for 24 hours and then the hydrogen peroxide solution is displaced with 1% by weight sodium bisulfite solution. Kelzan ® fluid injection is resumed. The injectivity of the well increases to 320 bbl/day at the 2000 psi injection pressure. Petroleum and aqueous fluids are recovered at the recovery well.

What is claimed is:

1. A method of restoring the permeability of a porous subterranean petroleum containing formation adjacent a well bore wherein organic or synthetic polymeric material and biological matter are lodged in the pores thus restricting the flow of aqueous fluids, the method comprising injecting into the formation through the well bore an aqueous solution consisting of water or brine wherein is dissolved from about 1% to about 30% by weight of hydrogen peroxide and from about 1% to about 30% by weight of an acid selected from the group consisting of hydrochloric, hydroflouric and acetic; and then allowing the well to remain quiescent for from 2 to 96 hours and then backflowing or displacing with an aqueous solution containing water or brine and from about 0.5% to about 3.0% by weight of sodium bisulfite.

2. The method of claim 1 wherein the aqueous solution contains dissolved therein from about 2 to about 10% be weight of hydrogen peroxide.

3. The method of claim 1 wherein the aqueous solution contains dissolved therein from about 200 ppm to about 2% by weight of a surfactant.

4. The method of claim 1 wherein the aqueous solution contains dissolved therein from about 0.1% to about 1% by weight of a surfactant selected from the group consisting of ethoxylated alcohols, ethoxylated alkyl phenols, alkylaryl sulfonates, alkyl polyethoxylated sulfates and sulfonates and alkylaryl polyethoxylated sulfates and sulfonates.

5. An aqueous solution for use in restoring the permeability of a porous subterranean petroleum containing formation comprising water or brine and from about 1% to about 30% by weight of hydrogen peroxide.

6. The aqueous solution of claim 5 wherein is dissolved from about 200 ppm to about 2% by weight of a surfactant and from about 1% to about 30% by weight of an acid.

7. A method of restoring the permeability of a porous subterranean petroleum containing formation adjacent a well bore wherein organic or synthetic polymeric material and biological matter are lodged in the pores, thus restricting the flow of aqueous fluids, the method comprising circulating an aqueous solution consisting of water or brine, from about 1% to about 30% by weight of hydrogen peroxide and from about 1% to about 30% by weight of an acid selected from the group consisting of hydrochloric, hydroflouric and acetic, down the tubing of a well bore and out the annulus for a period of time of about 12 hours to about 36 hours and then backflowing or displacing with an aqueous solution containing water or brine and from about 0.5% to about 3.0% by weight of sodium bisulfite.

* * * * *